Patented May 31, 1932

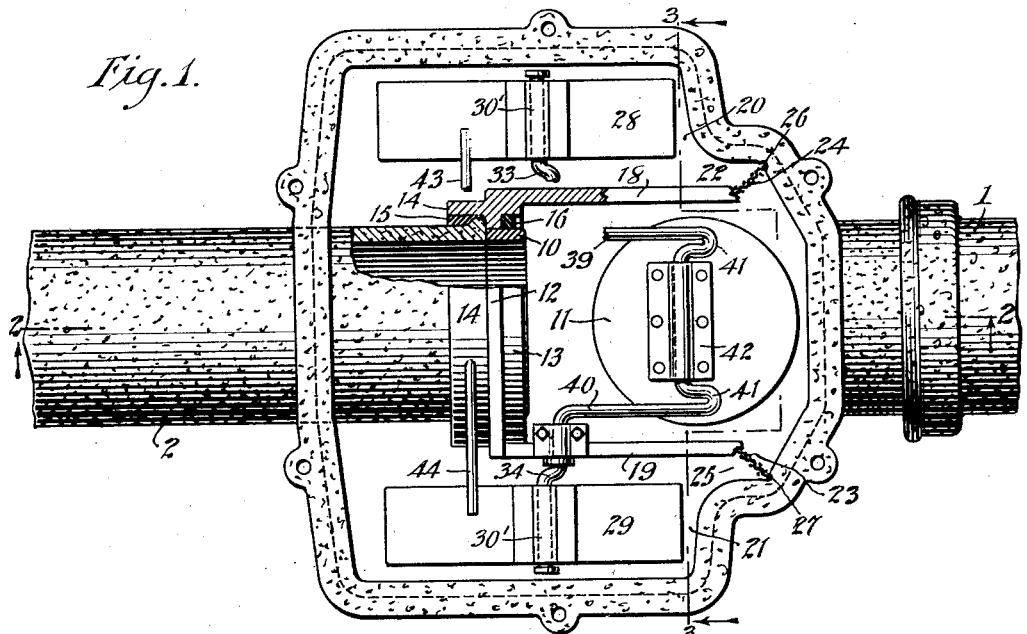

1,861,397

UNITED STATES PATENT OFFICE

ALBERT M. KHUN, OF ELIZABETH, NEW JERSEY

SUPERSERVICE FLOOD VALVE

Application filed January 14, 1931. Serial No. 508,767.

This invention relates to a superservice flood valve, the object being to provide a strong and efficient automatically acting flood valve which will not easily get out of order and which is adapted to be made as an all metal structure or as a part metal and part cement or concrete structure.

Another object of this is to provide a flood valve wherein a swinging valve member or gate is provided and associated with swinging floats.

A further object of the invention, more specifically, is to provide a flood valve wherein the valve member or gate and the moving part connected therewith are made from metal while the housing is made from concrete.

In the accompanying drawings—

Figure 1 is a top plan view of a flood valve disclosing the embodiment of the invention, the top plate being removed and certain parts broken away for better illustrating the construction.

Figure 2 is a sectional view through Figure 1 on line 2—2.

Figure 3 is a transverse sectional view of Figure 1 on line 3—3.

Referring to the drawings by numerals, 1 indicates the sewerage pipe leading to a river or other point of discharge, and 2, the sewerage pipe leading from the city, town or other place having sewerage. The flood valve 3 as shown in particular in Figure 2 connects pipes 1 and 2 and prevents any appreciable return flow from pipe 1. In towns and villages and the like, quite often it has been found that the sewerage pipes discharge into a river, bay or the ocean and when the tide is high, the water and sewerage backs up into the pipes. Oftentimes this back flow causes damage and is always objectionable. To prevent this back flow in cases of the kind specified, or prevent a back flow under any circumstances, a valve 3 is interposed between pipes 1 and 2. While this valve may be made completely of metal for the sake of cheapness, it is preferably made partly of metal and partly of cement. As shown in the accompanying drawings, the housing or casing 4 is made of cement and is preferably cast in place as in this way the connection 5 is watertight and the connection at 6 is of any desired form of packing. A cement cover plate 7 is held in place by suitable bolts 8 whereby access may be had at any time to the interior of the casing. It will be observed in Figures 1 and 2 that pipe 2 extends an appreciable distance into the housing or casing 4 and is provided with an annular flange or bead 9. A metal valve seat 10 is positioned in axial alinement with pipe 2 so as to coact with the gate or valve 11. The valve seat 10 and the valve gate 11 are preferably of some metal that will resist the action of water and most of the acids so that the sewerage will not appreciably affect either member. An annular supporting ring 12 contacts with the inner end of seat 10, a ring forwardly extending flange 13 and a rearwardly extending annular flange 14. The packing 16 also helps to keep the ring 12 in place as well as the valve seat 10. The packings may be lead or other desired material. Also, preferably the ring 12 is set slightly into the casing 4 at point 17 though this is not absolutely necessary. Extending from the ring 12 is the bottom flange 17 as shown in Figure 3 and the two side plates 18 and 19. These side plates and also flange 17 are preferably embedded slightly in the casing 4 but do not extend to the top of the casing. However, the plates 18 and 19 extend to a point beyond the respective chambers 20 and 21 whereby there is a tortuous passageway 22 adjacent plate 18 and a tortuous passageway 23 adjacent plate 19. Wire mesh screens 24 and 25 are extended from the respective ends of plates 18 and 19 to the respective points 26 and 27 of the casing 4. By reason of the construction just described, the tortuous passageway prevents the entrance of any sticks or large objectionable solid articles, even if the wire mesh screens are not present. These screens prevent the small sticks and other articles from passing into the respective chambers 20 and 21. Chambers 20 and 21 as shown in Figure 3 extend from the bottom to the top of the casing or housing 4 and accommodate the respective floats 28 and 29. The floats are preferably hollow metal containers but they could be made of some other material provided they present the proper buoyancy. An upstanding member 30 is welded, brazed, riveted or otherwise rigidly secured to the respective floats and the upper end of these members are provided with eyes 30′. The respective eyes 30′ accommodate the respective shafts 31 and 32, which shafts are bent upwardly at 33 and 34 and then parallel to the shafts 31 and 32 at points 35 and 36 whereby they readily rock in the bearings 37 and 38 carried by the plates 18 and 19. These bearings may be secured to these plates by brazing, welding or other desired means. From the bearings 37 and 38 the respective shafts present crank members 39 and 40 which merge into a central gate supporting shaft 41. The shaft 41 is connected by suitable bearing 42 to the gate or valve 11. The form of the member 42 is such that the gate can freely swing on the shaft 41 so that when the same is in an elevated position as shown in Figure 2, the gate will be almost horizontal when the shaft 41 moves downwardly as the floats 28 and 29 move upwardly, the gate 11 will freely swing to contact with the seat 11. Extending from the flange 14 are pins 43 and 44 which limit the upward swinging movement of one of the respective floats 28 and 29 so that after contacting with these pins, any additional movement must be from the opposite end. In any event the parts are so positioned that the gate will be closed either at the time or before the floats strike the pins 43 and 44.

From the drawings it will be seen that the floats operate by reason of the crank or bent members 33 and 34, whereby as the floats rise these members will move for swinging the gate shaft 41 downwardly and rock the respective shafts in bearings 37 and 38.

It will be understood that all the pivotal mountings and bearings and respective floats in respect to the gate are all very loose and, consequently, will not pinch or stick during operation of the device. As long as the liquid is flowing from pipe 2, and particularly where the same fills more than one-half of the pipe, gate 11 will be held wide open. However, as soon as any of the sewerage or water backs up from pipe 1, chambers 20 and 21 will begin to fill and, consequently, the floats will begin to rise so that the gate will begin to close. If the gate is closed about half-way and the back flow of fluid is comparatively swift, the movement of the fluid will assist in closing the gate in addition to the use of the floats. From the accompanying drawings, it will be seen that there is ample space around all the parts whereby any small obstacles getting into the chambers 20 and 21, or in any other parts, will not prevent the successful closing or opening of the gate. In case the tide should produce a back flow sufficiently to close the gate 11, no more fluid can pass backwardly into pipe 2, but as soon as the pressure of liquid in the pipe 1 has decreased, the gate will begin to open automatically. This opening action will continue until the gate is completely open as the level of liquid in pipe 1 continues to drop. It will be understood that after the complete flood valve has been installed, it operates automatically and may open and close many times in a day so as to allow the sewerage to flow out from time to time or whenever there is no back flow in the discharge pipe 1. In case the tide should become so high as to completely close the valve, no water from the tide will pass into pipe 2 but pipe 2 will act in a certain sense as a reservoir for receiving the flow of sewerage from the city. Usually this pipe is sufficiently large to take care of all the sewerage for a short time or until the tide has gone down, whereupon the valve will automatically open and the accumulated sewerage will quickly flow out into the river or other place to which the pipe 1 leads.

In forming the cover or lids 7 preferably a number of manholes 45 are provided. As illustrated in the drawings, one manhole for each of the compartments or chambers 20 and 21, and one above the gate 11 when the gate is raised. In respect to this gate it will be seen that shaft 41 is bent back upon itself as illustrated in Figure 1 whereby the gate 11 cannot open further than shown in Figures 1 and 2.

Also it will be noted from Figure 3 that the bottom of the casing is inclined toward the center whereby the chambers 20 and 21 will readily drain. In view of the fact that the bottom of the center of the casing 4 is in line with the outlet pipe 1, an efficient drainage is maintained at all times.

I claim:—

1. A flood valve including a casing adapted to receive the end of a sewer pipe, a gate positioned in said casing for closing the end of said sewer pipe, a ring carried by said sewer pipe, means acting as a crank shaft carried by said ring, said means having a crank portion connected with said gate, said means being connected to said gate and positioned to swing said gate to an open and closed position, said means also being provided with crank members at each end, a float adjacent each crank member, each of said floats having an upstanding bracket provided with a tubular bearing member surrounding said crank members whereby said floats are rotatably connected with said crank members.

2. A flood valve including a casing formed with a float chamber at each side and a discharge chamber centrally, said discharge chamber having an opening, said casing having an inlet in line with said opening, said inlet having a metallic seat, a gate adapted to close said seat, a crank member having a central crank portion and a crank portion adjacent each end, said central crank portion being pivotally connected with said gate and adapted to swing the gate toward and from said seat, a ring acting to support said crank member, a float arranged in each of said float chambers and means connected with each of said floats for pivotally connecting the same with said end crank members.

3. A flood valve including a casing having an outlet member and an inlet member, said inlet member being tubular and provided with a flange, a ring surrounding said inlet member and positioned against said flange said ring being formed with an annular flange surrounding the first mentioned flange, means for connecting said ring and flanges together, a valve seat held in place by said ring, a gate adapted to be moved toward and from said valve seat and float operated means for swinging said gate.

4. A flood valve including a casing having an inlet member and an outlet member, said inlet member being tubular, a metal valve seat arranged against the end of said inlet member, a ring surrounding said inlet member and said seat, said ring being provided with a depending flange and a pair of side plates, a gate positioned between said plates, a float arranged adjacent each of said plates exteriorly thereof and means actuated by said floats for swinging said gate toward and from said seat.

5. A flood valve including a casing having an inlet member and an outlet member, a gate adapted to be moved toward and from said inlet member, a pair of floats, rotatable means actuated by said floats carrying said gate whereby said floats move in one direction and the gate will be moved toward said inlet member for closing the same and when the floats are moved in the opposite direction will function to move said gate away from said inlet member, a ring carrying said rotatable means, said ring being provided with a pair of side plates extending near the outlet end of said casing, and a wire mesh partition extending from the ends of the respective plates to said casing.

6. A flood tide valve including a casing positioned to connect an incoming and outgoing sewerage pipe, the incoming sewerage pipe projecting to a point within the casing, said part extending into the casing being provided with a flange, a metallic ring abutting across said flange, said ring having a tubular portion overlapping said flange, packing arranged beneath said tubular portion and against said flange for locking said ring to the flange, said ring being provided with a pair of side plates extending from the bottom to near the top of the casing and to near one of the end walls thereof whereby with the incoming sewerage pipe the casing is substantially divided into a central compartment and two side compartments, said central compartment discharging directly into said outlet pipe, a float arranged in either of said side compartments, a crank member connected with said float, and a valve swingably connected to said crank member, said valve being positioned to close said discharge opening in said sewerage pipe when said floats have been raised and to move the valve member away from said inlet pipe when the floats have been lowered.

ALBERT M. KHUN.